United States Patent Office 2,945,140
Patented July 12, 1960

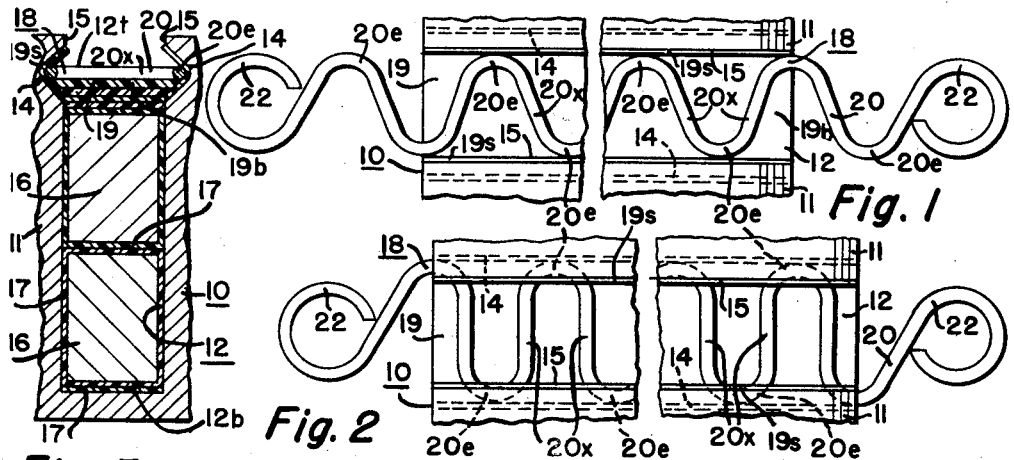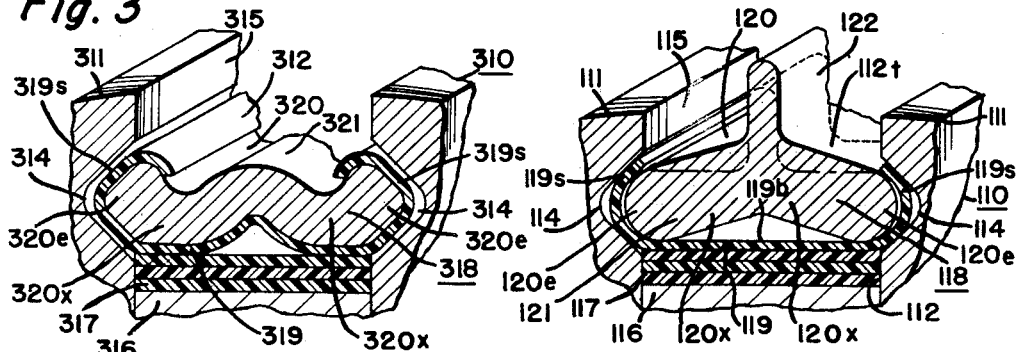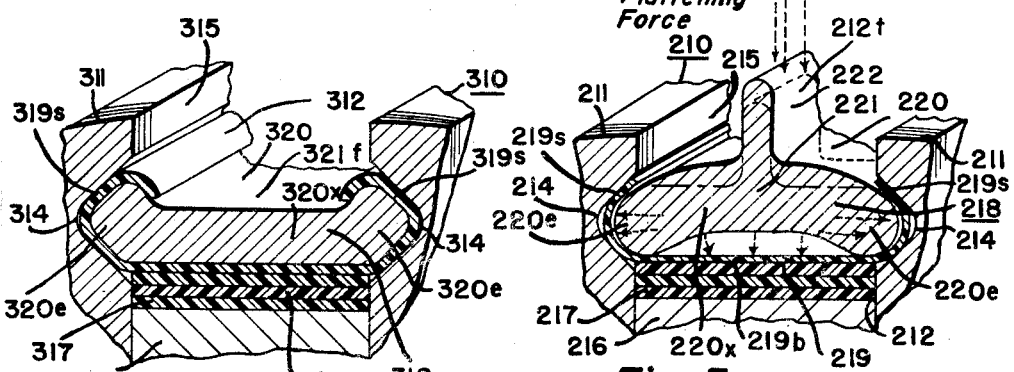

2,945,140

DYNAMOELECTRIC MACHINE SLOT WEDGES

Walter Drabik, Downers Grove, and Willard R. Stigler, Western Springs, Ill., assignors to General Motors Corporation, Detroit, Mich., a corporation of Delaware Filed Nov. 15, 1957, Ser. No. 696,822

3 Claims. (Cl. 310—214)

This invention relates to dynamoelectric machines, and particularly, to wedges for closing stator or rotor lamination slots into which conductors or windings have been placed.

An object of this invention is to provide new and improved electrical-insulating slot wedges for holding motor or generator winding conductors in lamination slots of stators or rotors of dynamoelectric machines.

Another object of this invention is to provide a slot closing wedge having an insulating channel portion, adapted to be inserted transversely across space adjacent to a top portion of a dynamoelectric machine lamination slot provided with lateral undercuts or grooves, and having a central body or metal member which is expanded laterally after insertion within the insulating channel portion for tightly engaging the wedge across the grooves adjacent the top portion of the slot.

Another object of this invention is to provide an expansion-spring slot-closing wedge having an insulating means located laterally on opposite sides of a plurality of loops of a tempered spring member stretched longitudinally to effect lateral contraction of loop ends and released longitudinally to effect lateral expansion of loop ends to contact and resiliently to urge the insulating means into locked engagement with lateral undercuts or grooves provided adjacent to a top portion of each lamination slot of a dynamoelectric machine.

A further object of this invention is to provide a slot-closing wedge for engagement between lateral undercuts or grooves provided adjacent a top space of a lamination slot, the wedge including a channel-type outer insulating member and an inner member of extruded metal with an intermediate portion initially extending upwardly between opposite lateral edges of the extruded metal to be forced flat and expanded laterally effecting engagement of the insulating member against the lateral undercuts of the slot.

Another object of this invention is to provide a slot-closing wedge for maintaining conductors imbedded in lamination slots of a dynamoelectric machine stator or rotor, the wedge including an inverted U-shaped insulating-material channel portion into which opposite legs of an inverted Y-shaped body portion of extruded metal are inserted, an upwardly extending leg of the inverted Y-shaped body portion being forced downwardly for flattening the opposite legs of the inverted Y-shaped body portion laterally outwardly positively to engage opposite upwardly extending sides of the channel portion against lateral undercuts or lateral grooves provided adjacent to a top space of each lamination slot into which the wedge is inserted.

Another object of this invention is to provide a slot-closing wedge for maintaining conductors imbedded in lamination slots of a dynamoelectric machine stator or rotor, the wedge including a substantially W-shaped body portion of extruded metal to which is bonded an outer peripheral insulating-material portion, the metal body portion being flattened under pressure applied downwardly upon the center of the substantially W-shaped portion thereby laterally expanding the opposite sides of the formerly W-shaped portion and bonded insulating-material portion firmly into locking engagement with lateral undercuts or grooves provided adjacent to a top space of each lamination slot.

Another object of this invention is to provide a method for closing lamination slots using wedges having a central body portion with an initially deformed midsection of metal within an outer insulating portion, including inserting the initially deformed metal midsection and insulation portions between lateral undercuts located adjacent to a space near a top of lamination slots, and expanding the midsection to force the insulating portion and central body portion outwardly and into engagement with each other locking underneath the undercuts.

Further objects and advantages of the present invention will be apparent from the following description, reference being had to the accompanying drawings wherein preferred embodiments of the present invention are clearly shown.

In the drawings:

Fig. 1 is a fragmentary top view of a longitudinally extended and laterally contracted spring-expansion slot-closing wedge positioned within a top space of a dynamoelectric machine slot.

Fig. 2 is a fragmentary top view of the spring-expansion wedge of Fig. 1 in a position where it is longitudinally contracted and expanded laterally for engaging insulating material against undercuts or lateral grooves adjacent to the top space.

Fig. 3 is an elevational cross-sectional view of the spring-expansion wedge of Fig. 2 after lateral expansion resiliently locking the wedge into engagement with lateral undercuts adjacent to a top space of a dynamoelectric machine lamination slot shown with winding conductors imbedded therein to be retained by the wedge.

Fig. 4 is a fragmentary elevational cross-sectional perspective view of a modification of a slot-closing wedge in initial extruded shape together with a phantom outline of final laterally-expanded shape of the wedge in accordance with the present invention.

Fig. 5 is a fragmentary elevational cross-sectional perspective view of a slot closing wedge similar to that represented in Fig. 4.

Figures 6 and 7 are fragmentary elevational cross-sectional perspective views of a modified extruded wedge in unexpanded and expanded positions, respectively, in accordance with the present invention.

Slot closing wedges commonly are provided to be forced longitudinally into a space between undercuts or grooves of opposite side surfaces adjacent to a top portion of lamination slots into which winding conductors of a dynamoelectric machine are placed. These conductors are retained firmly in place by such wedges that prevent centrifugal force from effecting displacement of the conductors for example. The wedges generally are driven longitudinally into a top portion of a lamination core slot and a forced fit during this driving action often results in damage which is eliminated in the present invention as wedges and insulating material are provided over the top of conductors and along opposite side surfaces of the slot having undercuts or grooving for locking engagement by the wedge.

Electrical-insulating slot wedges of the present invention permit use of insulating material to hinder or eliminate stray currents or electromagnetic flux from passing out of a steel sheet metal or lamination core into metal slot-closing wedges. In Fig. 1 there is shown one slot-closing wedge in accordance with the present invention. Also shown in Fig. 1 is a top fragmentary view of a magnetic core generally indicated by numeral 10 and formed of a plurality of laminations 11 stacked in alignment relative to each other for forming a slot generally indicated by numeral 12 and that extends longitudinally of the stack of laminated sheet metal. As illustrated by Figures 1, 2 and 3, the slot 12 is open at its top and has longitudinal undercuts or grooves 14 provided in opposite side surfaces 15 adjacent to a space near the top portion 12t of each slot 12. Placed in a bottom space portion 12b of each slot below the grooves 14 are winding conductors (or coils, not shown) 16 which are imbedded in the slots and surrounded or separated from side and bottom surfaces of each slot by insulating paper 17. Insulating paper 17 can be provided in multiple thicknesses adjacent the top and bottom surfaces of the conductors 16 of electrically conducting metal that is supplied with electrical energy or current resulting in an electromagnetic flux which is dispersed through the laminated core 10 for use in operation of a motor or generator rotor or stator.

The slot closing wedge illustrated by Figures 1, 2 and 3 is generally indicated by numeral 18 and includes an insulating-material portion 19 and a central body portion 20. The central body portion 20 is preferably a metal member which is expanded laterally after insertion in the insulating-material portion 19 both placed in space between grooves 14 of the side surfaces of the slot. As illustrated, the central body portion or metal member is a spring means or sine-wave-like spring member having a plurality of loops or leg portions 20x which cross back and forth transversely and progressively relative to the slot extending longitudinally of the stacked laminations 11. Each loop or transversely crossing leg portion is joined at opposite ends by bends of curved elbow or end portions 20e of the spring means. The leg and elbow portions lie in a plane which is substantially flat and parallel to a floor or transverse bottom section 19b of the insulating-material portion 19 which has laterally upwardly extending side wings 19s that are engaged into and locked underneath the grooves 14 of the slot side surfaces. In the cross sectional view of Fig. 3, the floor or bottom section 19b of the insulating-material portion is placed and maintained flat adjacent multiple layers of insulating paper 17 over the top of conductors 16 to be retained in the slot 12.

The spring means of the wedge of Figs. 1, 2, and 3 is provided with eyelets or finger grasping portions 22 at opposite ends thereof. By pulling the spring body member 20 longitudinally at opposite end grasping portions 22, there is effected a temporary longitudinal stretching of the relationship of transverse legs 20x relative to end portions 20e as illustrated by Fig. 1 such that a dimension less than the width of the slot opening is obtained for permitting insertion of the longitudinally extendible spring means downwardly from the top of each slot into space within the insulating-material-portion side wings between grooves or undercuts 14 during lateral contraction of the elbow portions to less than slot width due to longitudinal expansion or stretching of the spring means. Upon releasing of the ends of the springs in the method of using the wedge illustrated in Figures 1, 2, and 3, there is a longitudinal contraction of transverse leg portions 20x and elbow portions 20e relative to each other back to a natural and resiliently maintained position of the spring means illustrated in Figures 2 and 3 for retaining the elbow portions 20e against opposite inner surfaces of side wing portions 19s of the insulating-material portion 19 of the wedge holding the conductors 16 in slot space below the wedge locked in space between undercuts or grooves 14 having surfaces engaged by outer longitudinal surfaces of the side wing portions 19s. In the released natural position of the spring means the elbow portions and transverse leg portions thereof maintain a lateral expanded or extended positioning having a lateral dimension greater than the slot width so as to effect locking engagement of the wedge relative to the slot grooves or undercuts 14. Laterally expanding the body portion of the spring means results in engagement of lateral edges of the insulating material means or side-wing portions relative to the slot undercuts or longitudinal grooves. A plurality of units of lateral contact is provided by elbow portions 20e relative to the insulating material side wings maintained against the longitudinal grooves at opposite side surfaces of the slot. Depending upon stiffness of the insulating-material side wings, a greater or smaller number of units of contact may be required and provided for laterally outward baising thereof by tempered metal spring means.

In Figures 4 and 5 there are shown slightly modified versions of another embodiment of laterally expandable slot closing wedges 118 and 218 for use in slots 112 and 212 having top spaces 112t and 212t, respectively, formed by laminations 111 and 211 of cores 110 and 210. Insulating paper 117 and 217 as well as conductors 116 and 216 can be provided comparable to what is shown in Figures 1, 2, and 3. Comparable insulating-material portions 119 and 219 having floor segments 119b and 219b and side wings 119s and 219s, respectively, are also shown. These insulating-material portions are all substantially U-shaped in cross section and thus are longitudinal channels with upwardly extending sides having outer surfaces to be engaged against undercuts or grooves 114 and 214, respectively.

The wedges 118 and 218 each have central members or metal body portions 120 and 220, respectively, of extruded metal such as aluminum which is light in weight and therefore advantageous as to effect of centrifugal force for minimizing weight and balancing problems of a dynamoelectric machine armature or rotor for which the wedges of the present invention may be used. Each body portion 120 and 220 has a midsection or intermediate portion 121 and 221, respectively, which is initially in a deformed position or condition as the body portion is formed of extruded metal. Each midsection is spaced initially extending upwardly relative to the flat floor of the insulating material portion of the wedge. Body portions 120 and 220 are in effect inverted Y-shaped members or inner portions of the wedge of extruded metal having opposite downwardly extending legs 120x and 220x that terminate in longitudinal extending edges 120e and 220e for engaging side wings 119s and 219s against grooves 114 and 214, respectively. Upwardly extending legs 122 and 222 of body portions 120 and 220, respectively, serve as cooling or heat radiating fins to dissipate heat from the extruded metal and also serve as an upwardly extending projection to be rolled flat and downwardly as outlined by a phantom representation of a roller 222r used to apply force progressively along a peripheral upper edge of the fin. A solid downwardly stamping force applied simultaneously along the longitudinal length of the fin can also be used.

Application of force to legs 122 and 222 results in a flattening of midsections 121 and 221, respectively, concurrent with laterally expanding of legs 120x and 220x for engaging edges 120e and 220e firmly against side wings 119s and 219s. The version of Fig. 4 uses a V-shaped structure as formed by legs 120x and the version of Fig. 5 uses a trough or cup-like U-shaped structure as formed by legs 220x. Arrows in Fig. 5 illustrate lateral expansion and spreading of the legs 220x resulting from downward force applied to leg or fin 222. Phantom representations of resulting inverted-T-shaped wedges also are shown in the views of Figures 4 and 5.

Another version of laterally expandable slot-closing wedges in accordance with the present invention is shown in Figures 6 and 7 wherein reference numerals 310, 311, 312, 314, 315, etc., are applied to laminated-core slot structure similar to that identified by numerals 210, 211, 212, 214, 215, etc., in Fig. 5, for example. Wedge 318 of Figures 6 and 7 includes a central member or body portion 320 of extruded metal initially having a substantially W-shaped cross section shown by Fig. 6. A midsection or intermediate portion 321 of the central member is provided extending upwardly in spaced relation to flat insulating paper 317 over conductors 316 in slot 312. Insulating material portion 319 is bonded to a lower peripheral surface of central member 320 and is preferably made of polyester glass.

Fig. 7 illustrates how midsection 321 is flattened to midsection 321f through force applied downwardly thereto to effect lateral expanding of legs or segments 320x that results in engaging edges 320e and side wing edges 319s of the insulating-material portion 319 to a position complementary to and between grooves 314. Channel-type instead of bonded polyester-glass type insulating material can also be used. The wedge of Figures 6 and 7, like the wedges of Figures 4 and 5 is preferably of extruded light-weight metal.

While the embodiments of the present invention as herein disclosed constitute a preferred form, it is to be understood that other forms might be adopted.

What is claimed is as follows:

1. An expansion-spring slot-closing wedge for maintaining conductors imbedded in a lamination slot of a dynamoelectric machine stator or rotor, comprising, an insulating means having lateral edges located adjacent to longitudinal side grooves provided in opposite surfaces of an upper space of the slot, and spring means having a plurality of bends and connecting loop-legs transverse to the longitudinal side grooves, said spring means being longitudinally resilient and extendable to effect lateral contraction of said bends and legs to a dimension less than slot width and expanding laterally when released longitudinally for engaging the lateral edges of said insulating means against the longitudinal side grooves at a dimension greater than slot width.

2. An expansion-spring slot-closing wedge for maintaining conductors imbedded in a lamination slot of a dynamoelectric machine stator or rotor, comprising, an insulating means having lateral edges extending upwardly from a transverse connecting floor, and a spring member having sine-wave-like loops lying in a plane parallel to the floor of said insulating means, said spring member being longitudinally resilient and extendable to effect lateral contraction of the sine-wave-like loops to a transverse dimension less than slot width, and expanding laterally to a dimension greater than slot width when released longitudinally for engaging the lateral edges of said insulating means against longitudinal opposite-side undercuts adjacent to a top slot space.

3. A method for closing a lamination slot of a dynamoelectric machine, the steps comprising, inserting an insulating means having lateral edges extending upwardly from a transverse connecting floor, longitudinally extending a sine-wave-like expansion spring member having a plurality of loops lying in a plane parallel to the transverse connecting floor and thereby decreasing a transverse dimension of the loops to less than slot width, inserting the spring member into a space between the lateral edges of the insulating means both located in a position transverse to undercuts provided on opposite upper sides of the slot, and releasing the spring member for effecting contraction thereof longitudinally relative to slot length and for effecting expansion thereof laterally to a dimension greater than slot width, said releasing simultaneously effecting the lateral expansion of the spring member to engage the insulating means within the undercuts at a dimension greater than slot width.

References Cited in the file of this patent
UNITED STATES PATENTS

| | | |
|---|---|---|
| 1,260,674 | Jackson | Mar. 26, 1918 |
| 2,710,931 | Tittel | June 14, 1955 |
| 2,745,030 | Baldwin | May 8, 1956 |

FOREIGN PATENTS

| | | |
|---|---|---|
| 104,027 | Great Britain | Feb. 21, 1917 |
| 220,755 | Great Britain | Aug. 28, 1924 |
| 286,765 | Germany | Aug. 30, 1915 |
| 888,580 | Germany | Sept. 3, 1953 |